US010902584B2

(12) United States Patent
Levesque

(10) Patent No.: US 10,902,584 B2
(45) Date of Patent: Jan. 26, 2021

(54) DETECTION OF SURFACE IRREGULARITIES IN COINS

(71) Applicant: ULTRA ELECTRONICS FORENSIC TECHNOLOGY INC., Montreal (CA)

(72) Inventor: Serge Levesque, Lachine (CA)

(73) Assignee: ULTRA ELECTRONICS FORENSIC TECHNOLOGY INC., Montreal (CA)

(*) Notice: Subject to any disclaimer, the term of this patent is extended or adjusted under 35 U.S.C. 154(b) by 120 days.

(21) Appl. No.: 16/312,520

(22) PCT Filed: Jun. 22, 2017

(86) PCT No.: PCT/CA2017/050760
§ 371 (c)(1),
(2) Date: Dec. 21, 2018

(87) PCT Pub. No.: WO2017/219141
PCT Pub. Date: Dec. 28, 2017

(65) Prior Publication Data
US 2020/0184616 A1    Jun. 11, 2020

Related U.S. Application Data

(60) Provisional application No. 62/353,756, filed on Jun. 23, 2016.

(51) Int. Cl.
*G06T 7/00*     (2017.01)
*G06T 7/586*    (2017.01)
(Continued)

(52) U.S. Cl.
CPC .............. *G06T 7/001* (2013.01); *G01B 21/20* (2013.01); *G06T 7/586* (2017.01); *G07D 5/005* (2013.01);
(Continued)

(58) Field of Classification Search
CPC ...... G07D 7/202; G07D 7/2033; G07D 5/005; G06K 2009/0059; G07F 17/3241
See application file for complete search history.

(56) References Cited

U.S. PATENT DOCUMENTS 5,615,760 A * 4/1997 Vaks ................... G06K 9/6272
                                                             194/206
6,819,410 B2   11/2004 Adameck et al.
(Continued)

FOREIGN PATENT DOCUMENTS

CN      101819692 B     8/2012
EP         1197926      2/2006
(Continued)

OTHER PUBLICATIONS

M. Hossfeld et al., "Fast 3D-Vision System to Classify Metallic Coins by their Embossed Topography", Electronic Letters on Computer Vision and Image Analysis 5(4):47-63, 2006.
(Continued)

*Primary Examiner* — Dung Hong
(74) *Attorney, Agent, or Firm* — Norton Rose Fulbright Canada LLP

(57) ABSTRACT

Detection of surface irregularities in coins. Three-dimensional topographic data of at least one surface of a coin, having at least one feature, is acquired and used to determine characteristics of the coin features, based on vector components of normal vectors at various points on the surface of the coin. The feature characteristics are then compared to reference feature characteristics. Based on this comparison, an irregularity indication is provided if differences between the feature characteristics and the reference characteristics are found.

20 Claims, 10 Drawing Sheets

(51) Int. Cl.
 *G01B 21/20* (2006.01)
 *G07D 5/00* (2006.01)
 *G07D 5/10* (2006.01)
(52) U.S. Cl.
 CPC ............ *G07D 5/10* (2013.01); *G06T 2200/04* (2013.01); *G06T 2207/10028* (2013.01); *G06T 2207/30136* (2013.01)

(56) References Cited

U.S. PATENT DOCUMENTS

| | | | |
|---|---|---|---|
| 7,004,299 | B2 | 2/2006 | Eich et al. |
| 7,019,826 | B2 | 3/2006 | Vook et al. |
| 7,684,607 | B2 | 3/2010 | Joshi et al. |
| 8,340,401 | B2 | 12/2012 | Matabosch I Gerones et al. |
| 8,615,123 | B2 | 12/2013 | Dabic |
| 8,695,416 | B2 * | 4/2014 | Fortin ............... G07D 5/08 73/163 |
| 9,922,486 | B2 | 3/2018 | Truong et al. |
| 2004/0108183 | A1 * | 6/2004 | Sugata ............... G07D 5/005 194/328 |
| 2004/0184653 | A1 | 9/2004 | Baer et al. |
| 2006/0032726 | A1 * | 2/2006 | Vook ............... G07D 5/005 194/328 |
| 2009/0296365 | A1 | 12/2009 | Haddock |
| 2012/0087566 | A1 | 4/2012 | Mori et al. |
| 2012/0293623 | A1 | 11/2012 | Nygaard |
| 2012/0301009 | A1 * | 11/2012 | Dabic ............... G07D 5/005 382/136 |
| 2013/0202184 | A1 * | 8/2013 | Grove ............... G07D 5/00 382/136 |
| 2013/0279279 | A1 | 10/2013 | Kaizerman et al. |
| 2013/0315437 | A1 * | 11/2013 | Kerschner ............ G06K 9/6202 382/100 |
| 2014/0355864 | A1 * | 12/2014 | Truong ............... G06K 9/6202 382/136 |
| 2015/0235499 | A1 | 8/2015 | Grove |
| 2015/0355102 | A1 | 12/2015 | Kido |
| 2015/0363990 | A1 * | 12/2015 | Truong ............... G07D 7/20 382/136 |
| 2017/0191946 | A1 * | 7/2017 | Smith ............... G06T 7/0002 |

FOREIGN PATENT DOCUMENTS

| | | |
|---|---|---|
| WO | 2011156919 | 12/2011 |
| WO | 2015031922 | 3/2015 |
| WO | 2015185935 | 12/2015 |

OTHER PUBLICATIONS

Y. Wei et al., Analysis of Depth from Defocus Measurements for Micro-Imaging and 3D Micro-Visual Reconstruction, Proceedings of the 2005 IEEE, International Conference on Information Acquisition, Jun. 27-Jul. 3, 2005, Hong Kong and Macau, China, pp. 326-331.

A. Gavrijaseva et al., "Image Based Counterfeit Coin Validation", 14th Biennial Baltic Electronics Conference (BEC2014), Tallinn, Estonia, Oct. 6-8, 2014, pp. 153-156.

International Search Report and Written Opinion dated Sep. 21, 2017 in connection with PCT application No. PCT/CA2017/050760.

Extended European Search Report dated Jan. 24, 2020 in connection with European Application No. 17814381.4

Reinhold H-M et al.: "Inspection Methods for Metal Surfaces: Image Acquisition and Algorithms for the Characterization of Defects", Computer Vision and Machine Learning with RGB-D Sensors, Sep. 2015, Springer International Publishing, 40 pages.

* cited by examiner

DETECTION OF SURFACE IRREGULARITIES IN COINS

CROSS-REFERENCE TO RELATED APPLICATIONS

The present application claims the benefit of U.S. Provisional Patent Application No. 62/353,756 filed on Jun. 23, 2016, the contents of which are hereby incorporated by reference.

TECHNICAL FIELD

The present disclosure relates generally to image processing, and more specifically to the use of three-dimensional image processing to detect counterfeit coins.

BACKGROUND OF THE ART

Still today, coins are used as a major component of many world currencies. Modern minting techniques have improved the precision with which coins are made, and have allowed for increasingly complex designs and anti-counterfeiting measures. However, the forging and counterfeiting of coins is a rapidly-adapting industry, as fake coins increasingly resemble real coins and fool existing anti-counterfeiting strategies.

Specifically, modern counterfeit coins often have accurate size and mass to trick traditional dimension-based anti-counterfeiting systems. Additionally, modern counterfeiting techniques correct for issues which commonly affected counterfeit coins, such as rusting surfaces and unexpected magnetic effects. Thus, traditional anti-counterfeiting systems, which may use optical detectors to determine dimensions of a coin or magnetic systems to validate a composition of the coin, are often defeated by modern forged coins.

As such, there is a need for new anti-counterfeiting strategies which are not easily defeated by modern counterfeiting techniques.

SUMMARY

The present disclosure provides methods, systems, and computer-readable media for detecting surface irregularities in coins. Three-dimensional topographic data of at least one surface of a coin, having at least one feature, is acquired and used to determine characteristics of the coin features, based on vector components of normal vectors at various points on the surface of the coin. The feature characteristics are then compared to reference feature characteristics. Based on this comparison, an irregularity indication is provided if differences between the feature characteristics and the reference characteristics are found.

In accordance with a broad aspect, a method for detecting an irregularity in a coin having at least one feature is provided. The method comprises: acquiring 3D topographic data of at least one surface of the coin, the 3D topographic data comprising at least one region of interest; determining vector components of a normal vector for at least some points of the at least one region of interest; determining at least one feature characteristic based on the vector components of each normal vector; comparing the at least one feature characteristic against reference feature characteristics; and providing an irregularity indication when a difference between the at least one feature characteristic and the reference feature characteristics is outside a predetermined tolerance.

In some embodiments, acquiring 3D topographic data of at least one surface of the coin comprises acquiring data for at least two of a top surface, a bottom surface, and a peripheral surface of the coin.

In some embodiments, acquiring the 3D topographic data comprises acquiring a two-dimensional elevation map image.

In some embodiments, determining vector components of a normal vector comprises determining x, y and z axis components of the normal vectors.

In some embodiments, determining at least one feature characteristic based on the vector components comprises at least one of a contour of a feature, a surface area of a feature, and a distance between two features.

In some embodiments, determining vector components of a normal vector comprises determining an inclination angle and an inclination direction for the at least some points of the at least one region of interest.

In some embodiments, determining at least one feature characteristic based on the vector components comprises generating an angle image based on the inclination angle of each normal vector and a direction image based on the inclination direction of each normal vector.

In some embodiments, the method further comprises determining at least one of a currency and a denomination of the coin.

In some embodiments, the method further comprises identifying the at least one region of interest based on the at least one of the currency and the denomination of the coin, prior to acquiring the 3D topographic data of the at least one surface.

In some embodiments, the method further comprises repeating the method based on at least one of 3D topographic data of a higher resolution and 3D topographic data of at least one other region of interest.

In accordance with another broad aspect, there is provided a system for detecting an irregularity in a coin having at least one feature. The system comprises a processing unit; and a non-transitory memory communicatively coupled to the processing unit and comprising computer-readable program instructions. The program instructions are executable by the processing unit for acquiring 3D topographic data of at least one surface of the coin, the 3D topographic data comprising at least one region of interest; determining vector components of a normal vector for at least some points of the at least one region of interest; determining at least one feature characteristic based on the vector components of each normal vector; comparing the at least one feature characteristic against reference feature characteristics; and providing an irregularity indication when a difference between the at least one feature characteristic and the reference feature characteristics is outside a predetermined tolerance.

In some embodiments, acquiring 3D topographic data of at least one surface of the coin comprises acquiring data for at least two of a top surface, a bottom surface, and a peripheral surface of the coin.

In some embodiments, acquiring the 3D topographic data comprises acquiring a two-dimensional elevation map image.

In some embodiments, determining vector components of a normal vector comprises determining x, y and z axis components of the normal vectors.

In some embodiments, determining at least one feature characteristic based on the vector components comprises at least one of a contour of a feature, a surface area of a feature, and a distance between two features.

In some embodiments, determining vector components of a normal vector comprises determining an inclination angle and an inclination direction for the at least some points of the at least one region of interest.

In some embodiments, determining at least one feature characteristic based on the vector components comprises generating an angle image based on the inclination angle of each normal vector and a direction image based on the inclination direction of each normal vector.

In some embodiments, the program instructions are further executable for determining at least one of a currency and a denomination of the coin.

In some embodiments, the program instructions are further executable for identifying the at least one region of interest based on the at least one of the currency and the denomination of the coin, prior to acquiring the 3D topographic data of the at least one surface.

In some embodiments, the program instructions are further executable for repeating the method based on at least one of 3D topographic data of a higher resolution and 3D topographic data of at least one other region of interest.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Coins for use in currency are objects usually having two surfaces and an outer periphery. They are typically made of metal, such as copper, nickel, silver, etc., or alloys thereof, and are minted to provide features on the surfaces and/or on the outer periphery. These features may include letters forming words or sentences, numbers, for example to indicate a year of minting, and images of persons, animals, objects, and the like. The particular orientation of the features, or more specifically the vectors normal to the features (described in greater detail hereinbelow), are used as a basis against which potentially counterfeit coins are compared.

Figure 1A:
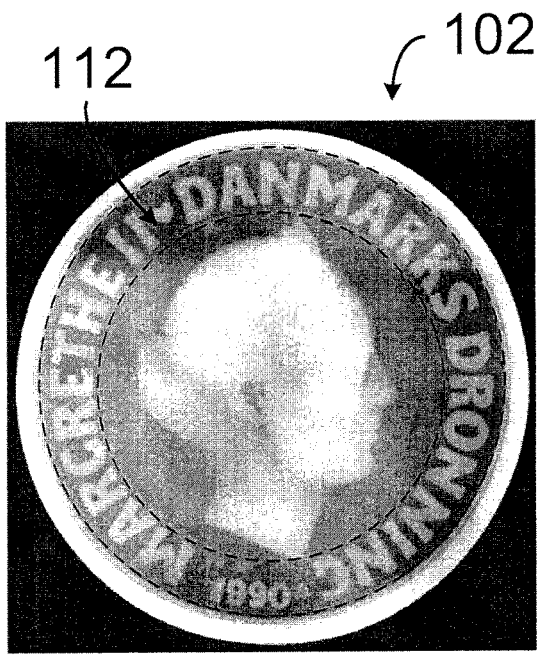
FIG. 1A is an elevation map of an example coin.
Figure 1B:
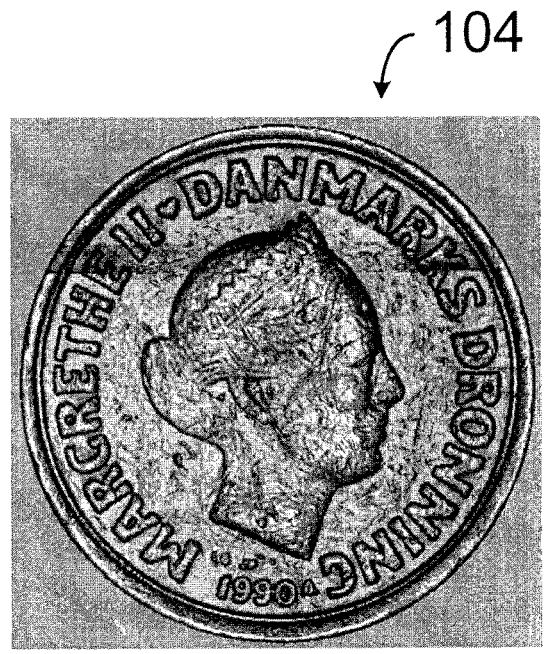
FIG. 1B is an example three-dimensional (3D) rendering of the coin of FIG. 1A.

With reference to FIG. 1A, a three-dimensional (3D) image of a surface of a coin, specifically a face-side of a 1990-edition 20 kroner coin from Denmark, is shown in the form of an elevation map image 102. The elevation map image 102 is one possible visual representation of 3D topographic data representative of the surface of an actual physical coin. In some embodiments, the elevation map image 102 conveys the relative height of different regions of the coin in grayscale, where lighter tones represent higher portions and darker tones represent lower portions. In some other embodiments, the elevation map image 102 uses a colour-based scale to convey relative height; the relative height of different regions of the coin may be conveyed according to any suitable scale. With reference to FIG. 1B, the 3D topographic data can also be interpreted by a rendering engine or other computer program that simulates the reflection of a virtual light source on the 3D surface to produce a 3D rendered image 104.

The three-dimensional (3D) topographic data can be acquired by an optical 3D sensor such as a confocal sensor, a focus variation sensor, a white light interferometry sensor and the like or other image acquisition tool or camera, such as a laser-based scanner, an electromagnetic-wave-based scanner, a sound-based scanner, and the like. In some embodiments, the elevation map image 102 can be generated based on a plurality of two-dimensional images acquired with two-dimensional image acquisition tools, such as stereo photometric methods and the like. The 3D topographic data may be implemented in any suitable fashion, using as many or as few bits as appropriate to accurately represent the surface of the coin. Methods for acquiring the 3D topographic data are discussed in greater detail hereinbelow.

The 3D topographic data may be used as a basis for identifying one or more regions of interest on the surface of the coin. Regions of interest include, for example, a letter, a number, a group of letters and/or numbers, a symbol or group of symbols, a face, an animal, an object, or any portion thereof. In some embodiments, a face marking on a surface of the coin includes several regions of interest, for example an ear, a nose, a chin, and the like. The identification of the regions of interest may be performed using one or more image processing techniques, such as edge detection, a combining scaling algorithm, a structural similarity algorithm, feature detection, or any other suitable algorithm or combination of algorithms.

Figure 1C:
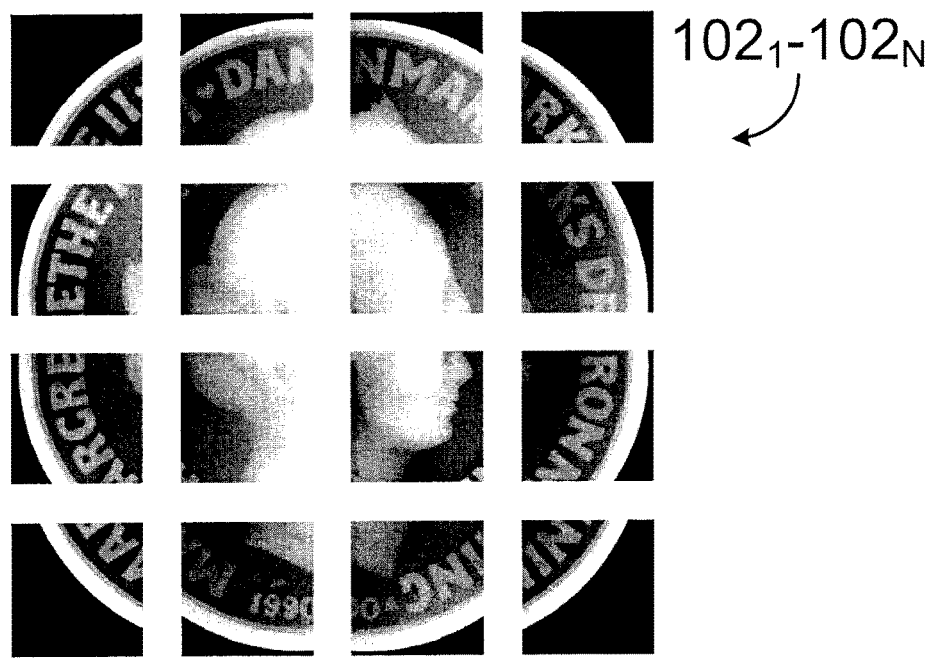
FIG. 1C is a collection of elevation map image portions of the coin of FIG. 1A.

In some embodiments, the 3D topographic data may be acquired by the image acquisition tool as composite data. With reference to FIG. 1C, the image acquisition tool can, instead of capturing the surface of the coin as one set of 3D topographic data, acquire a sequence of sets of 3D topographic data, represented by images $102_1$-$102_N$, each of a different portion of the coin, and then stitch together the sets of 3D topographic data, and the associated images $102_1$-$102_N$, of the different portions to create one complete elevation map image 102 of the whole surface of the coin based on a sequence of sets of 3D topographic data. In some embodiments, stitching together the images $102_1$-$102_N$ is performed by juxtaposing the images $102_1$-$102_N$, and in other embodiments stitching together the images $102_1$-$102_N$ is performed by partially overlapping the images $102_1$-$102_N$. In some other embodiments, instead of capturing 3D topographic data of the whole of the surface of the coin, 3D topographic data of only portions of the surface of the coin is acquired. These acquired 3D topographic data portions may be selected on the basis of the presence of particular regions of interests located in these portions.

The particular regions of interest for each coin may vary from coin to coin as well as from one evaluation of a coin to another. A list or index of relevant regions of interest for a given coin may be stored in a database (described in greater detail hereinbelow) or other data repository. In some cases, the order of the entries for a given coin is indicative of a priority of the regions of interest. For example, a first evaluation of a coin focuses on a first region of interest including a letter, and if a second evaluation is to be performed, the second evaluation focuses on a particular curvature of an animal depicted on the coin.

Figure 2A:
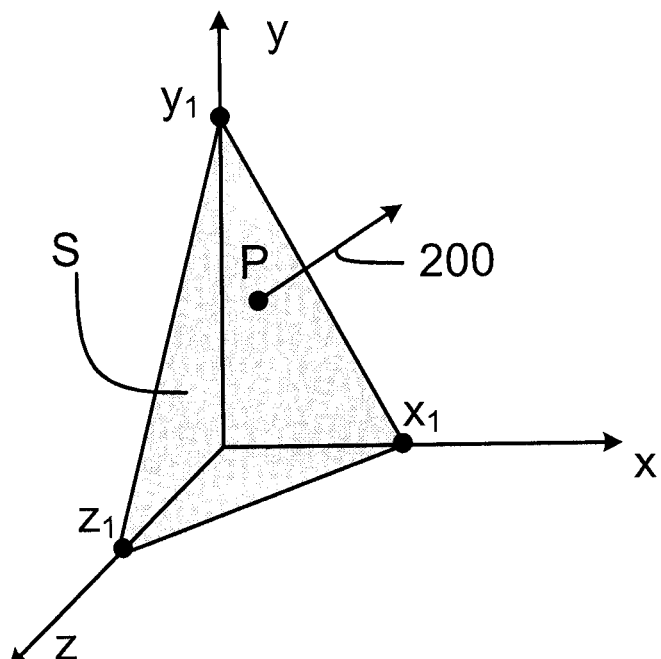
FIGS. 2A-B are example graphical representations of normal vectors.

Vectors normal to features on coins are used as a basis against which potentially counterfeit coins are compared. With reference to FIG. 2, a vector 200 is considered to be a normal vector, or simply a "Normal", to a surface S formed between points $x_1$, $y_1$, $z_1$ if the vector 200 is perpendicular to the surface S. Where the surface S is curved, the vector 200 is considered normal at a point P on the surface S if the vector 200 is perpendicular to a plane which is tangent to the surface S at the point P. A normal vector can have any suitable magnitude, and a specific type of normal vector, called the unit normal vector, is defined as having a magnitude of 1.

Figure 2B:
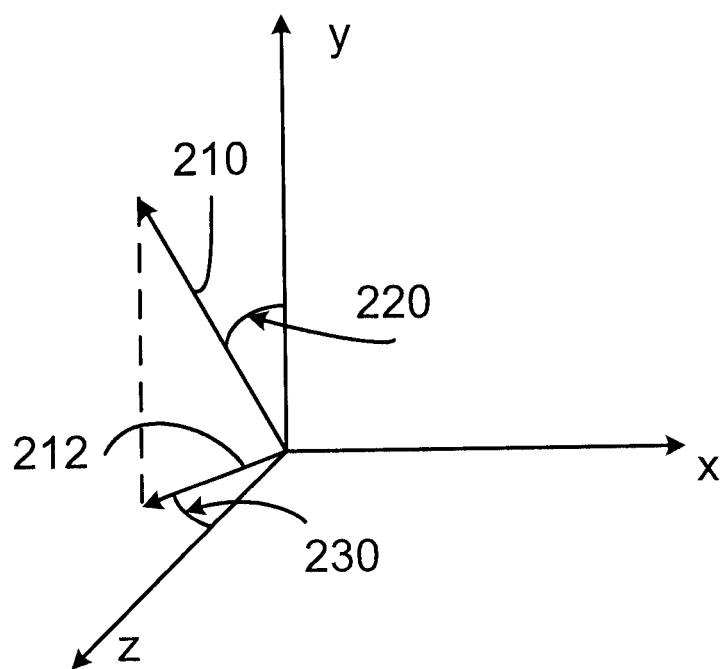

With reference to FIG. 2B, an example normal vector 210 may be defined in terms of components. For example, the normal vector 210 can be defined by a magnitude and two angles: an inclination angle 220, which represents the inclination of the normal vector 210 from a vertical axis (in this case a y-axis), and an inclination direction 230, which represents a heading of the normal vector 210 on a two-dimensional plane (in this case defined by the x-axis and the z-axis). In some embodiments, the normal vector 210 is a unit normal vector having a magnitude of 1. To determine the inclination direction 230, a horizontal projection 212 of the normal vector 210 can be used, where the inclination direction 230 is the angle between the horizontal projection 212 and a predetermined axis. While in FIG. 2B the inclination direction 230 is shown as being relative to the z-axis, it should be noted that this is simply for the purposes of illustration, and that the inclination direction 230 may be relative to any suitable reference line. In other embodiments, other component definitions may be used to define the normal vector 210, such as x-, y-, and z-axis components, polar coordinates, and the like.

Figure 3C:
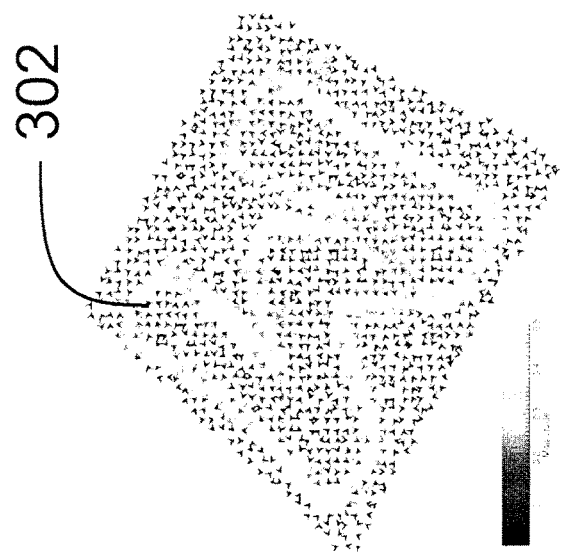
FIG. 3C is a normal vector inclination direction image of the example feature of FIG. 3A.
Figure 3B:
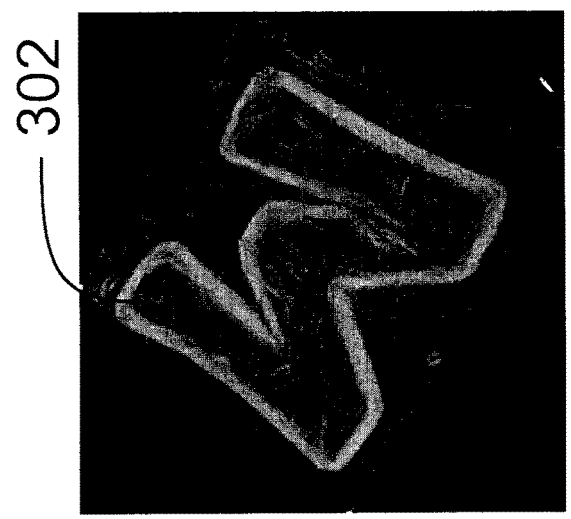
FIG. 3B is a normal vector inclination angle image of the example feature of FIG. 3A.
Figure 3A:
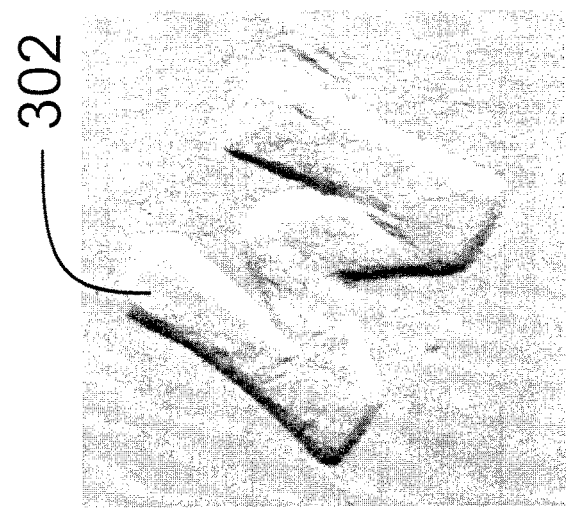
FIG. 3A is a 3D rendered image of an example feature of the coin of FIG. 1A.

By determining the normal vector components for a plurality of points of a given region of interest, a vector component image can be generated. In the following discussion, the normal vectors may be unit normal vectors, or normal vectors having any suitable magnitude. For illustrative purposes, and with reference to FIG. 3A, there is shown a 3D rendered image of an M-shaped feature 302 of the coin illustrated in FIG. 1A, which will be used as an example. The 3D topographic data on which the 3D rendered image of FIG. 3A and/or the aforementioned model are based may be used to generate the angle image and the direction image. With reference to FIG. 3B, an inclination angle image of the normal vectors for the M-shaped feature 302 can be generated, where the inclination angle varies between 0°, in black, and 90°, in white. FIG. 3C shows an inclination direction image of the M-shaped feature 402, where the inclination direction at each point is illustrated by a vector. In some embodiments, the magnitude of the inclination direction vector is represented by a color, a shade, a thickness, or any other suitable mechanism. In some further embodiments, the vector component images can be images based on the vector components. For example, the inclination angle of various points on a region of interest are used to define a particular surface, such as a surface of a particular feature, and the vector component image can be a representation of that particular surface.

Figure 4:
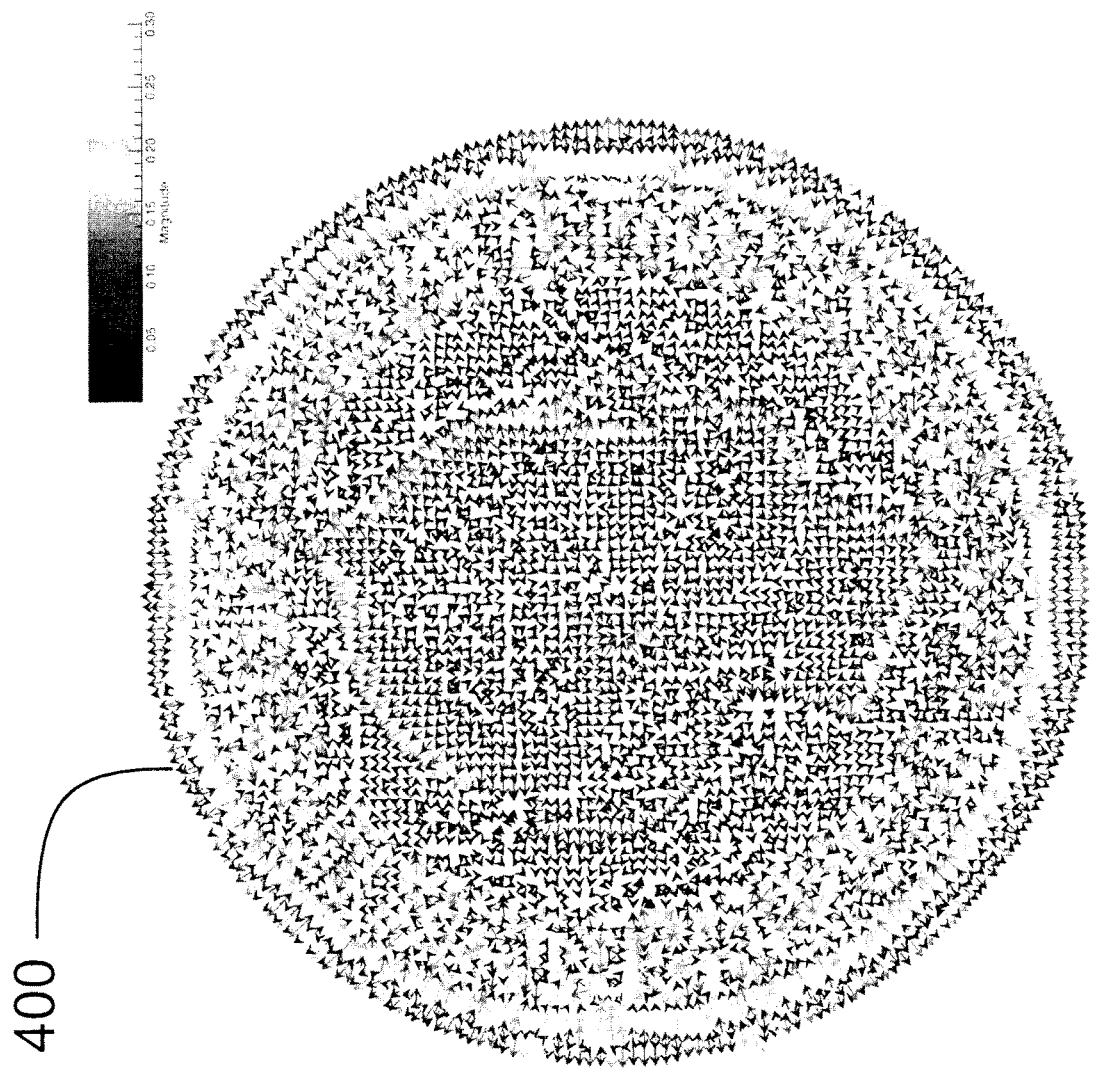
FIG. 4 is a normal vector inclination direction image of the coin of FIG. 1A.

With reference to FIG. 4, a direction image of the whole surface of the coin can also be generated. In some embodiments, the resolution of the angle image and direction image changes depending on the size of the region of interest. Thus, when generating a direction image for the M-shaped feature 402, the number of points for which normal vector components are determined may be different than when generating a direction image for the coin as a whole. Alternatively, a constant resolution may be used regardless of the area of the coin for which a component image of the coin is generated, or regardless of the size of the region of interest. In some embodiments, fewer normal vector components are determined for smaller regions of interest, and in other embodiments, more normal vector components are determined for smaller regions of interest.

Other scales can be used for the angle image and the direction image, and other implementations of the angle image and the direction image are also considered. For example, the direction image could represent the inclination direction as a colour gradient, or as a heat map, and the like.

Figure 5C:
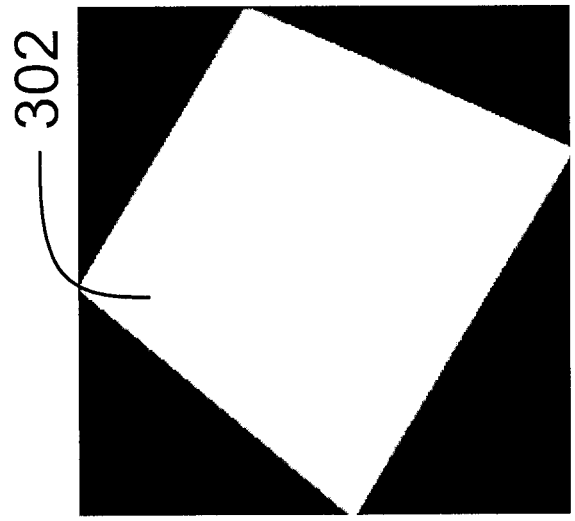
FIGS. 5A-C are x-, y-, and z-axis normal vector component images of the example feature of FIG. 3A.
Figure 5B:
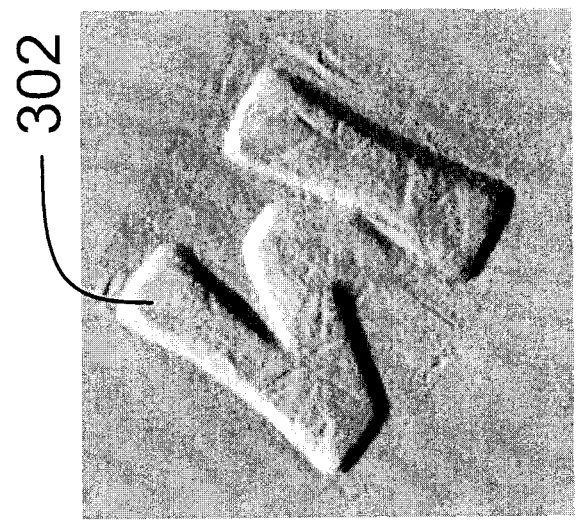
Figure 5A:
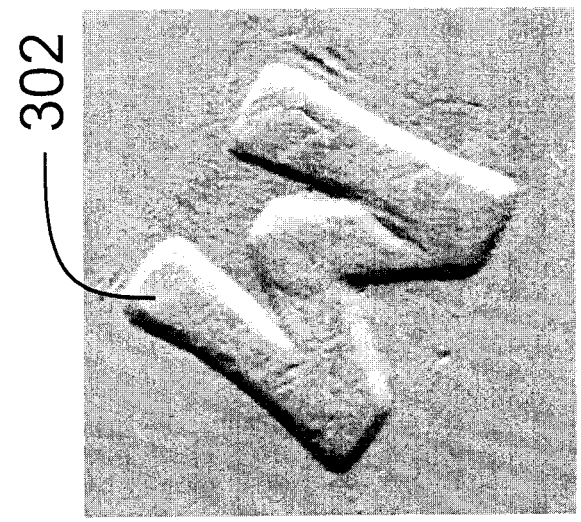

In an alternative embodiment, and with reference to FIGS. 5A-C, x-, y-, and z-axis components of the normal vectors can be used instead of inclination angles and inclination directions. Thus, the normal vectors can be defined in terms of their x-, y-, and z-axis components and similar processing can be performed on the acquired three-dimensional image to determine these components. FIG. 5A shows an x-axis component image of the normal vectors for the M-shaped feature 302. In this example, the values for the x-axis component can vary between −1, represented by black, and +1, represented by white, and where grey indicates 0, or no x-axis component. FIG. 5B shows a y-axis component image of the normal vectors for the M-shaped feature 302 which uses the same scale as the x-axis component image of FIG. 5A. FIG. 5C shows a z-axis component image of the normal vectors for the M-shaped feature 302. In this example, the values for the z-axis component can vary between 0, in black, and 1, in white. In other embodiments, the x-, y-, and z-axis components of the normal vectors may be represented in other ways, including colour-based scales and the like. Additionally, the normal vectors may be expressed using different components, such as polar coordinate components, and the like.

The angle image and direction image, or any other vector component image, is used as a basis for locating irregularities in the features of the coin. Specifically, the angle image and the direction image are compared to reference images based on known valid coins or any other suitable reference, such as a marking blank used for minting coins. The reference images can also be generated using machine learning techniques applied to known valid coins, or using any other suitable technique.

The comparison can be effected using any suitable image-processing algorithm, including point-by-point, pixel-by-pixel, voxel-by-voxel (i.e., 3D pixel-by-pixel) comparisons, artifact-based comparisons, and the like. The reference images for a given region of interest may be implemented in fundamentally similar ways as the angle image and direction image. That is to say, in an embodiment where the angle image is a monochrome map where black is 0° and white is 90°, the reference angle image is a similar monochrome map which is based on coin features of valid coins. The comparison may reveal differences between the angle image and the direction image and their respective reference images: if the differences fall beyond a given threshold, it may be concluded that irregularities are present in the features of the coin, which may be indicative that the coin is counterfeit.

In other embodiments, the vector components of the normal vectors are used to determine other characteristics of features present on the coin. For example, the normal vectors may be analyzed to determine a contour of a given feature on a coin, a surface area of a given feature, a distance between two features, and the like. Any suitable feature characteristic can be used as a basis for comparison against reference feature characteristics.

Figure 6:
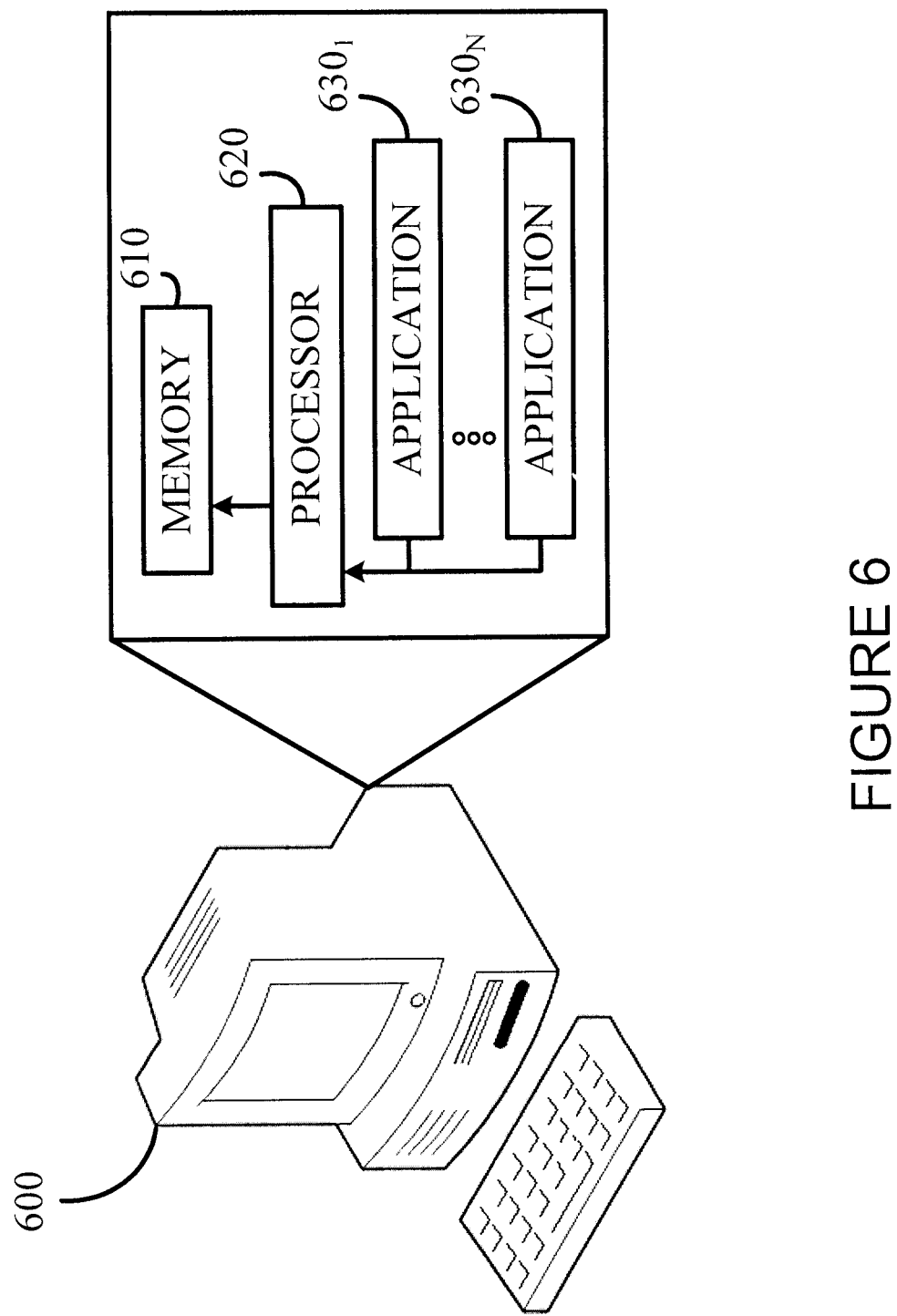
FIG. 6 is a block diagram of an example coin irregularity detection system.

With reference to FIG. 6, a coin irregularity detection system using the techniques discussed herein can be implemented by any suitable computing device 600. The computing device 600 comprises any suitable type of processor 620, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The computing device 600 also comprises any suitable type of computer memory 610, the computer memory 610 being located internally or externally. For example, the computing device 600 includes random-access memory (RAM), read-only memory (ROM), optical-disc-based read-only memory, electro-optical memory, magneto-optical memory, erasable programmable read-only memory (EPROM), electrically-erasable programmable read-only memory (EEPROM), Ferroelectric RAM (FRAM), and the like. The computing device 600 comprises a network interface (not pictured) in order to communicate with other components, including databases, to access and connect to network resources, and to perform other computing applications by connecting to one or more networks capable of carrying data.

The computing device 600 is configured to run or execute any number of applications $630_1$-$630_N$. The applications $630_1$-$630_N$ are stored in the memory 610, and are executed on the processor 620. One such application, for example application $630_1$, implements the coin irregularity detection system. In embodiments where the coin irregularity detection system is configured for sorting coins according to their validity, the computing device 600 can be configured to connect to or to operate a mechanical sorting mechanism (not illustrated) used to sort the coins. In some embodiments, the application $630_1$ operates within the context of a larger coin validating and sorting operation, which receives coins, evaluates the coins using the coin irregularity detection system, and sorts the coins on the basis of one or more factors. In these embodiments, the application $630_1$ evaluates one or more coins and provides an output relating to the evaluation of the coin to an exterior component or application of the coin validating and sorting operation. In other embodiments, the application $630_1$ comprises features in addition to those described hereinbelow to control the operation of the larger coin validating and sorting operation.

Figure 7:
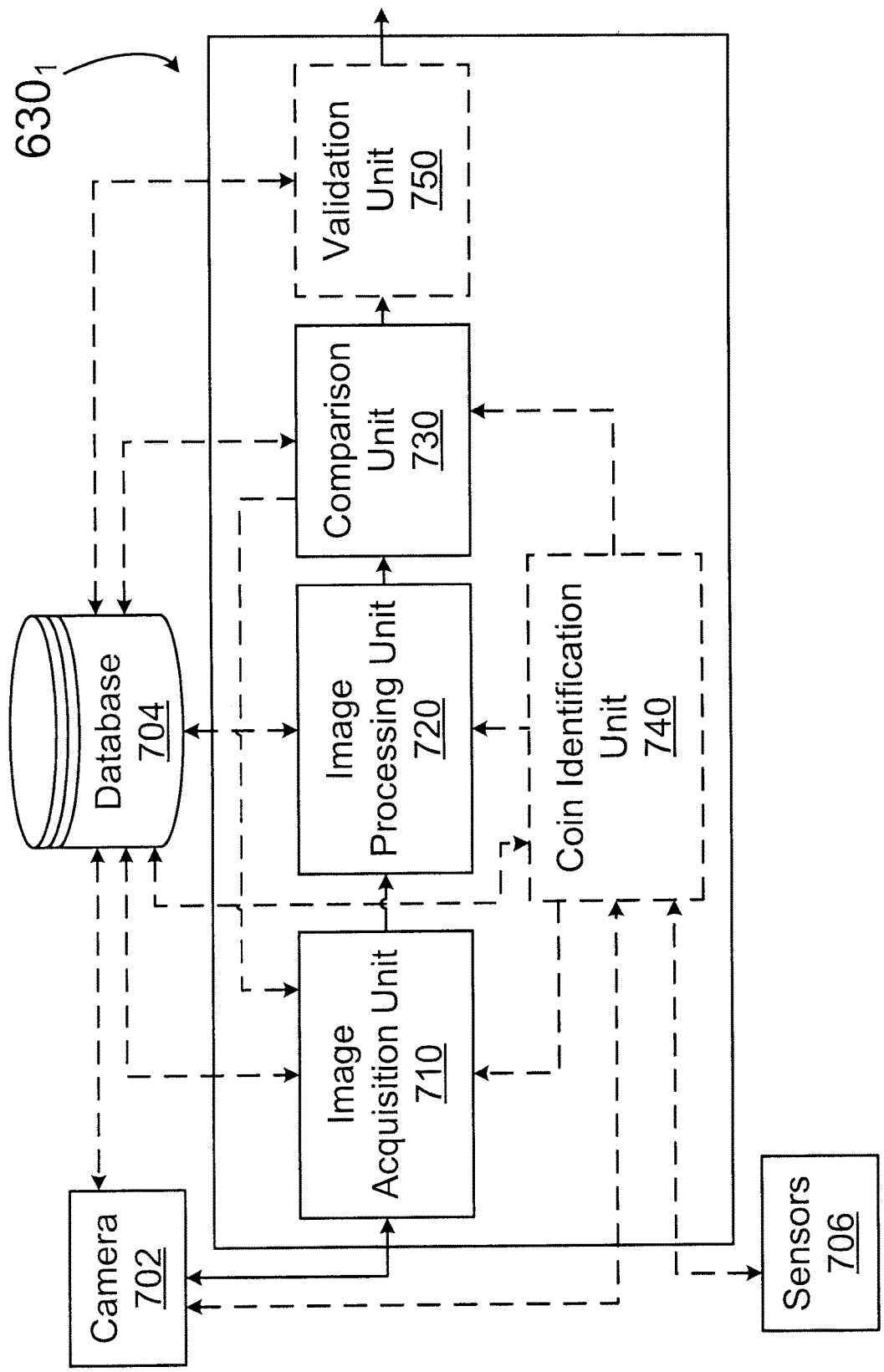
FIG. 7 is a block diagram of an example application running on the system of FIG. 6.
Figure 8:
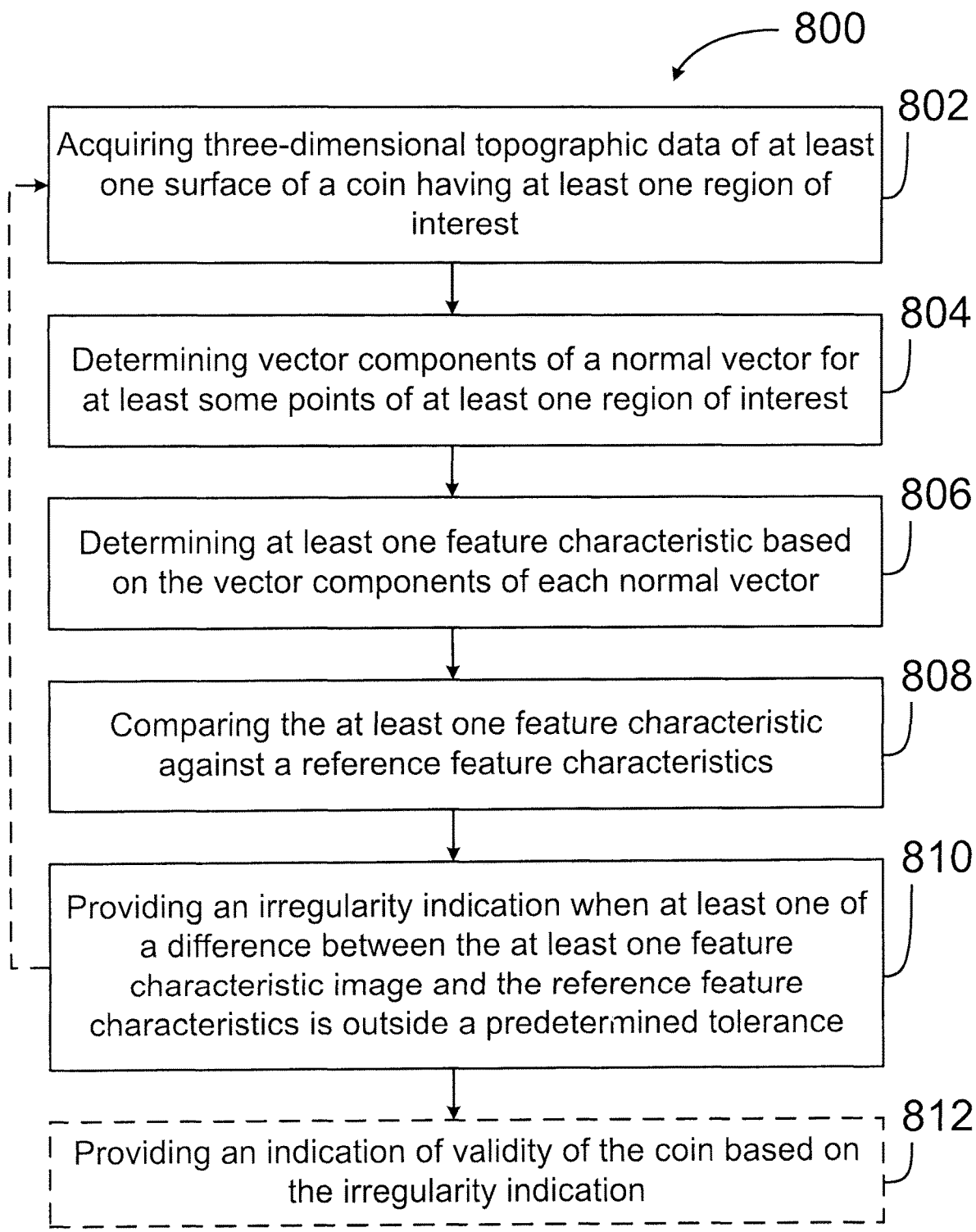
FIG. 8 is a flowchart of a method for detecting irregularities in a coin in accordance with an embodiment.

With reference to FIG. 7, application $630_1$, which implements the coin irregularity detection system, illustratively comprises an image acquisition unit 710, an image processing unit 720, and a comparison unit 730, and optionally comprises a coin identification unit 740 and a validation unit 750. With reference to FIG. 8, the application $630_1$ is also configured for implementing a method 800 for detecting an irregularity in a coin on the basis of normal vectors at various locations of a region of interest on the surface of the coin.

The image acquisition unit 710 is configured for being communicatively coupled to a camera 702 for acquiring 3D topographic data of at least one surface of the coin from the camera 702 in accordance with step 802 of method 800. The 3D topographic data captures at least one region of interest, and the coin in question has at least one feature. The camera 702 may be any suitable camera or optical system configured for acquiring 3D topographic data of a surface of a coin, such as a laser-sweep camera, a confocal microscopy camera, a focal-variation camera, and the like. The camera 702 provides image data to the image acquisition unit 710 in any suitable fashion and format. The image acquisition unit 710 may be communicatively coupled to the camera 702 via wired or wireless means, for example via the network interface, and may acquire image data from the camera 702 using any suitable data transmission protocol, including RS-232, USB™, USB-C™, SATA, Lightning™, Ethernet, Bluetooth™, ZigBee™, Wi-Fi, and the like. In alternative embodiments, the image acquisition unit 710 may retrieve the 3D topographic data from a memory, or may receive the 3D topographic data via a transmitter from another source, such as another application, or an entity remote to the computing system 600.

The 3D topographic data acquired by the image acquisition unit 710 may be any form or type of image data suitable for representing the surface of the coin. The 3D topographic data may be elevation data of the surface of the coin where the height z of the surface of the coin is a function of the (x,y) coordinates along the surface of the coin. Alternatively, the 3D topographic data may be a collection of 3D points, or voxels, which together make a 3D model or other 3D representation of the coin. For example, the 3D topographic data is a collection of voxels which represent the surface of the coin and which store a '0' for lack of surface and a '1' for presence of surface. Alternatively still, the 3D topographic data may be a collection of points having (x,y,z) coordinates representative of the surface.

The image acquisition unit 710 is thus configured to acquire 3D topographic data of at least one surface of a coin from the camera 702. Alternatively, the image acquisition unit 710 is configured to acquire the 3D topographic data from the database 704. In some embodiments, the image acquisition unit 710 is configured to instruct the camera 702 to acquire the 3D topographic data and to store the 3D topographic data in the database 704. Alternatively still, the image acquisition unit 710 is configured to acquire the 3D topographic data from some external source, which may be local or remote from the computing system 600.

The 3D topographic data corresponds to at least one region of interest and is composed of a plurality of pixels or voxels. In some embodiments, only one of the two surfaces (i.e. the top surface and the bottom surface) of the coin is acquired, and in other embodiments both top and bottom surfaces of the coin are acquired. In some embodiments, 3D topographic data of the surface of the coin further includes the peripheral surface of the coin. The 3D topographic data of the surface of the coin may be acquired as a single image or may be a composite image based on a sequence of images.

The image acquisition unit 710 is also configured for communicating with the camera 702 to instruct the camera 702 to acquire images including particular regions of interest. For example, the image acquisition unit 710 instructs the camera 702 to acquire 3D topographic data that includes a particular portion of the coin where a desired region of interest is located. The instructions to the camera 702 from the image acquisition unit 710 may be based on the index of regions of interest, which may be acquired from the database 704. In such embodiments, the camera 702 is movable, for example via motorized axes or other suitable components. In some embodiments, the image acquisition unit 710 receives instructions from other components of the coin irregularity detection system, for example the comparison unit 730, indicating particular regions of interest that should be present in the 3D topographic data acquired by the camera 702, and the image acquisition unit 710 is configured for providing these instructions to the camera 702.

The image acquisition unit 710 is configured to provide the 3D topographic data to the image processing unit 720. Alternatively, the image acquisition unit 710 is configured to store the 3D topographic data in the database 704 and to instruct the image processing unit 720 to acquire the 3D topographic data from the database 704. In embodiments where the 3D topographic data is provided as a sequence of images to be stitched together, the image acquisition unit 710 can be configured to perform the image stitching and to provide the composite image to the image processing unit 720. In other embodiments, the image acquisition unit 710 provides the image processing unit 720 with an unstitched sequence of images.

The image processing unit 720 is configured to receive the 3D topographic data of the surface of the coin from the image acquisition unit 710 or from the database 704 following receipt of instructions from the image acquisition unit 710. The image processing unit 720 is also configured to determine vector components of normal vectors for at least some points of the regions of interest, in accordance with step 804 of the method 800. In some embodiments, the image processing unit 720 receives a sequence of images which it stitches together to form a composite image. The image processing unit 720 is also configured for processing the 3D topographic data to identify regions of interest and for selecting points for which the normal vector will be determined. In some embodiments, the image processing unit 720 accesses the database 704 to obtain the index of regions of interest to determine which area of the 3D topographic data should be processed. In some further embodiments, the image processing unit 720 is configured to receive instructions from the image acquisition unit 710 pertaining to particular regions of interest which should be processed. The normal vectors for the selected points can be determined, for example, by creating a model of the surface of the coin based on the 3D topographic data received from the image acquisition unit 710 and using the model to determine the normal vectors. Alternatively, or in addition, the normal vectors for the selected points can be determined directly from the 3D topographic data. The normal vectors are then broken down into inclination angle and inclination direction components. Alternatively, any suitable vector components can be used.

The image processing unit 720 is further configured for determining at least one feature characteristic based on the vector components of each normal vector, in accordance with step 806 of the method 800. In some embodiments, the image processing unit 720 is configured for generating the angle image and the direction image based on the inclination angles and inclination directions, and for providing the angle image and the direction image to the comparison unit 730. Optionally, the image processing unit 720 may store the 3D topographic data, the angle image, and/or direction image in a database 704, which can be done in addition to providing the comparison unit 730 with the angle and direction images, or instead of providing the angle and direction images to the comparison unit 730.

The comparison unit 730 is configured for receiving the angle image and the direction image from one of the image processing unit and the database 704, and for retrieving reference feature characteristics from the database 704. The comparison unit 730 is further configured for performing a comparison of the determined feature characteristics against the reference feature characteristics, as per step 808 of the method 800. The comparisons may be performed by way of any suitable image comparison technique, including value-based comparisons, point-by-point, pixel-by-pixel, voxel-by-voxel (i.e., 3D pixel-by-pixel) comparisons, artifact-based comparisons, extracted features comparisons, and the like. For example, the comparison unit 730 performs a point-by-point comparison and then generates an array of values, each corresponding to a given point, where 0 indicates no difference and a non-zero value indicates the existence of a difference, and optionally the magnitude of the difference. Other types of comparisons and ways of representing the comparisons are also considered. Alternatively, or in addition, the comparison unit 730 may also be configured to store a representation of differences between the angle and direction images and their respective reference images in the database 704.

The comparison unit 730 is further configured for providing an irregularity indication based on the differences between the determined feature characteristic and the reference feature characteristics if the differences are outside a predetermined threshold, as per step 810 of the method 800. The irregularity indication may be in the form of a signal, a command, a flag, or any other suitable output provided by the coin irregularity detection system. The irregularity indication may be passed on to a subsequent system or another application or program, or may be used to make further evaluations, as discussed in greater detail below.

The difference between the angle image and the reference angle image and/or between the direction image and the reference direction image is based on the comparison effected by the comparison unit 730. The difference may be quantified as a number of points with differing normal vector components, as a size of a region of interest where points do not match the reference image, or in any other suitable way. The tolerance may be expressed in similar fashion: thus, where the difference is quantified as a number of differing points, the tolerance can be expressed as an allowable upper limit of differing points. For example, in an embodiment where the image acquisition system 710 acquires 3D topographic data having a single region of interest composed of 100 points, the tolerance is set as an allowable upper limit of 5 differing points.

In some embodiments, if the difference between the angle image and the reference angle image and the difference between the direction image and the reference direction image is within the predetermined tolerance, the comparison unit 730 provides no irregularity indication, and instead provides no indication at all or provides a different indication, such as a conformity indication. In other embodiments, the coin irregularity detection system still produces an irregularity indication if the differences are within the predetermined tolerance. This irregularity indication can indicate any differing points and further indicates that the differences fall within the predetermined tolerance.

Optionally, the comparison unit 730 is configured to store the irregularity indication in the database 704, for example in association with an identifier of the evaluated coin. The identifier may be a serial number of the coin, a serial number of the evaluation performed, or any other suitable identifier.

Optionally, the comparison unit 730 can provide instructions to the image acquisition unit 710 so that one or more different sets of 3D topographic data are acquired to repeat the method 800. In some embodiments, the instructions to the image acquisition unit 710 includes a code or other information instructing the image acquisition unit 710 of particular regions of interest for which 3D topographic data should be acquired. For example, if a first execution of the method 800 by the application $630_1$ acquires a 3D topographic data with only a first given region of interest, such as a word inscribed on a portion of a coin, the comparison unit 730 can instruct the image acquisition unit 710 that certain second regions of interest should be present in subsequently acquired 3D topographic data sets when repeating the method 800. The selection of the second regions of interest can be based on the nature of the irregularity indication provided by the comparison unit 730, based on the index of regions of interests from the database 704, or based on any other suitable criteria. Alternatively, or in addition, the method 800 is repeated but the image acquisition unit 710 acquires a higher resolution 3D topographic data set. Still other modifications to the repetition of method 800 are considered, such as determining certain regions of interest which should be present in the 3D topographic data acquired by the image acquisition unit 710.

Optionally, the application $630_1$ further comprises the coin identification unit 740 configured for identifying coins for evaluation. Although illustrated as being included in the application $630_1$, in some embodiments the coin identification unit is external thereto, Specifically, the coin identification unit 740 is configured for determining the currency to which a coin belongs, the denomination of the coin, and any other information of importance to the application $630_1$, such as a serial number of the coin and the like. For example, in a hypothetical jurisdiction where a plurality of currencies are accepted as legal tender and the application $630_1$ is integrated into a vending machine, the coin identification unit 740 determines to which of the currencies an inserted coin belongs, and determines the denomination of the coin.

The coin identification unit 740 may use any suitable techniques for performing the identification of coins, including dimension-based tests, magnetic-response-based tests, and the like. To this end, the coin identification unit 740 may be communicatively coupled to the camera 702 and/or to sensors 706. The coin identification unit 740 is configured to issue instructions to the camera 702 to acquire images to assist in the identification of the coin. Similarly, the coin identification unit 740 is configured to issue instructions to the sensors 706 to obtain sensor data to assist in the identification of the coin. The sensors 706 may include a scale or other weight-detection sensor, a laser-based measurement sensor or other optical sensor, a magnetic-response-based sensor, and the like. Additionally, the coin identification unit 740 is configured to provide identifying information about the coin to the image acquisition unit 710, the image processing unit 720, and the comparison unit 730. The coin identification unit 740 is also configured for storing coin identifying information in the database 704.

In some embodiments, the coin identification unit 740 is configured for providing the index of regions of interest to the image acquisition unit 710 for instructing the camera 702 to acquire certain sets of 3D topographic data and/or to the image processing unit 720 to determine which area of the 3D topographic data should be processed. In other embodiments, the coin identification unit 740 is configured for providing instructions to the image acquisition unit 710 indicating particular regions of interest that should be present in the 3D topographic data acquired by the camera 702. In further embodiments, the coin identification unit is configured for instructing the image acquisition unit 710 to repeat the method 800 and to acquire subsequent 3D topographic data sets in which certain second regions of interest are present.

In some embodiments, there is more than one reference image against which the angle image and/or the direction image are compared, and the coin irregularity detection system can be configured to select one of the comparisons or to average or otherwise combine the comparisons. For example, the comparison unit 730 may obtain from the coin identification unit 740 an identifier of specific reference images which match the regions of interest and/or the computed normal vectors for a particular evaluation of the coin.

Optionally, the application $630_1$ further comprises the validation unit 750 configured for receiving the irregularity indication from the comparison unit 730, and for providing an indication of validity of the coin based on the irregularity indication as per optional step 812 of the method 800. The validation unit 750 may be provided with a series of rules dictating whether a given coin should be considered valid or not, based on a nature and/or a severity of the irregularity indication provided by the comparison unit 730.

In some embodiments, the application $630_1$ is further configured to interface with a screen or other display device, a speaker or other sound-producing device, and/or a mechanical sorting mechanism to provide one or more of a visual, audible, or physical output based on the irregularity indication and/or the indication of validity provided by the comparison unit 730 and the validation unit 750, respectively. For example, the coin irregularity detection system can have a screen or other output device, and the indication of validity can be expressed in the form of a symbol, for example a checkmark or an X, on the screen. The coin irregularity detection system may also provide the indication of validity in any other suitable way, for example an audio cue, or may cause the coin to be sorted according to the indication of validity, in embodiments where the coin irregularity detection system includes the mechanical sorting mechanism.

Additionally, in some embodiments, the various units of the application $630_1$ are configured to perform their respective tasks on a plurality of coins at substantively the same time. For example, a predetermined number of coins can be placed in a tray or other holding implement and processed substantively simultaneously by the coin irregularity detection system to execute the method 800. Then, the coins are placed into piles, bins, or subsequent trays, based on the indication of validity for each of the coins. Other embodiments are also considered.

In some embodiments, the image processing unit 720 instead generates x-, y-, and z-axis images, the comparison unit 730 compares these axis images to reference axis images, and the comparison unit 730 provides an irregularity indication when differences between the axis images and the reference axis images are outside a predetermined tolerance. In some embodiments, a combination of inclination direction/angle components and x-, y-, z-axis components can be used. Further embodiments can use any suitable vector components, or any suitable combination of vector components, including for example, polar coordinates.

In some further embodiments, the coin irregularity detection system and the application $630_1$ are configured to be operational for a given type of coin. For example, a particular coin irregularity detection system running a particular instance of the application $630_1$ is configured for processing 20-kroner coins, and another particular coin irregularity detection system running another particular instance of the application $630_1$ is configured for processing 10-kroner coins. Alternatively, a particular coin irregularity detection system running a particular application $630_1$ is configured for processing only coins of a particular currency, such as Danish kroner. Alternatively still, different coin irregularity detection systems and/or applications $630_1$ are configured for evaluating certain aspects of coins: for example, a first coin irregularity detection system and/or application $630_1$ is configured to evaluate the surfaces of coins, or a particular subset of the features thereon, and a second coin irregularity detection system and/or application $630_1$ is configured to evaluate the outer periphery of coins. In some embodiments, there is provided a coin irregularity detection system running an application $630_1$ which can evaluate any number of aspects of any number of denominations of coins of any number of currencies simultaneously.

One example implementation of the coin irregularity detection system can be used to detect counterfeit coins. One or more suitable cameras are used to acquire 3D topographic data for a given test coin. The acquired 3D topographic data is of a "heads" side of the test coin, where features include a profile view of a person and one or more letters, for example the face-side of the 1990-edition 20 kroner coin from Denmark of FIGS. 1A-B. With reference to FIG. 1A, the 3D topographic data is then processed to isolate a peripheral ring region 112, enclosed by the dashed lines. One or more letters are located in the peripheral ring region 112. Once the peripheral ring region 112 is isolated, each of the letters located in the peripheral ring region 112 are segmented, and respective perimeters of the letters are determined. The peripheral ring region 112 and the letters located therein can be isolated using any suitable image processing techniques, such as radiance imaging, elevation imaging, normal component imaging, or any suitable combination thereof.

Then, vector components are determined for each point within the perimeter of each letter. The vector components may be x-, y-, and z-axis components, inclination angle and direction components, polar coordinate components, or any other suitable vector components. Then, a contour is determined for each letter, where one or more vector components reach a given threshold. In one example, inclination angle and direction components are determined for each point within the perimeter of each letter. The contour of a letter is defined by the region where the inclination angle $\theta$ falls within threshold angle $\theta_{threshold}$, or may be defined in any other suitable way.

Once the contour of each letter is found, the surface of the contour for each letter is determined. The surface of each letter contour can be, for example, a certain number of pixels, and is assigned an identifier, such as a sequential number. For example, the 1990-edition 20 kroner coin has 27 letters, so the identifiers range from 1 to 27. The surfaces are processed to determine an average and standard deviation for the inclination angle of the points located within the contour surfaces. Optionally, other vector components can be determined for the points located within the surfaces $S_i$, such as average inclination direction, a standard deviation of the inclination direction, and the like.

The above-described example can also be used on known reference pieces to accumulate data about the known reference pieces, for example to use as a basis against which test pieces can be compared.

To compare the vector components of the test coin to reference data, the 3D topographic data is processed to determine, for each letter, a corresponding reference letter. The reference letters may be the letters of a known reference piece, or may be simulated reference letters based on reference data. The corresponding reference letters each have reference data indicative of the vector components for the reference letters. The reference vector components can include any suitable vector components. Then, for each letter of the test coin, a difference or ratio (or any other suitable relationship) between numeral values of the vector components for the test coin and numerical values of the reference vector components. For example, the surface areas of the contours and standard deviations for the inclination angle of points located within the contours are compared to the reference values for the reference coin.

Figure 9:
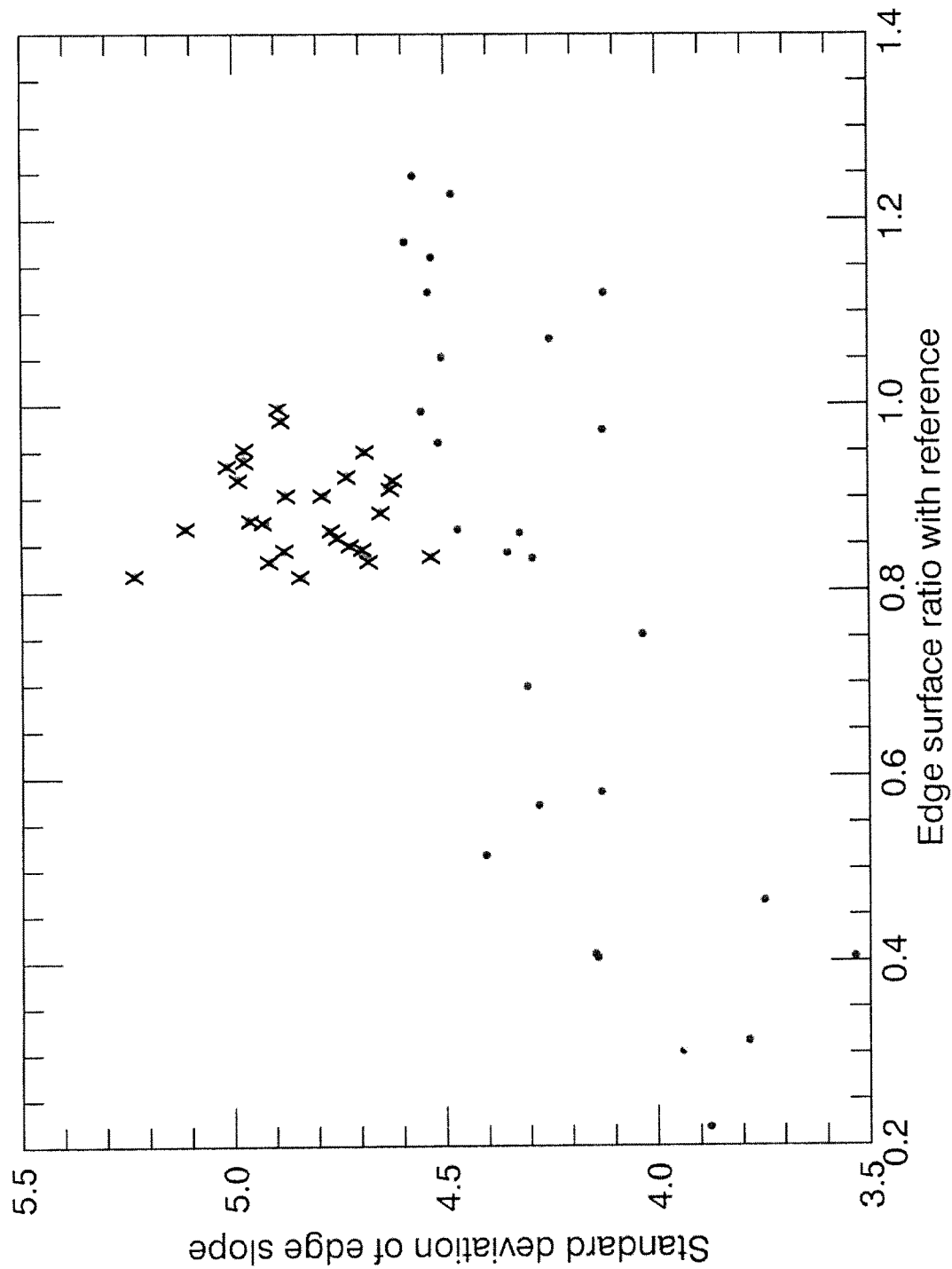
FIG. 9 is a chart of example values of extracted features for two coins.

With reference to FIG. 9, a comparison between a known counterfeited test piece and a reference piece is shown, with the 27 letter contour features of the test piece shown as dots, and the 27 letter contour features of the reference piece shown as crosses. The horizontal axis shows the surface area ratios, and the vertical axis shows the standard deviation of the inclination angles of points on the contour of the surfaces. Determining whether the test piece is valid based on the data points in FIG. 9 can be performed manually, or can be performed by a computer algorithm or program, which may use machine learning, deep learning, machine vector support, neural networks, and the like. In some embodiments, a principle component analysis is performed to determine which types of vector components are more likely to vary from one coin to another, in order to more easily isolate the vector components to be compared. In some embodiments, a statistical method, such as the kernel density estimation method, or a variant thereof, is used to determine the validity of the test coin based on the location of the data points for the test coin vis-à-vis the reference data. For example, a statistical method can be used to determine a "cloud" of data points for known valid coins, and the determination of the validity of the test coin can be based on a number of vector components which land within the bounds of the cloud. The cloud may be two-dimensional, three-dimensional, or may be expressed in any suitable number of dimensions, depending on the number of vector components evaluated.

Figure 10:
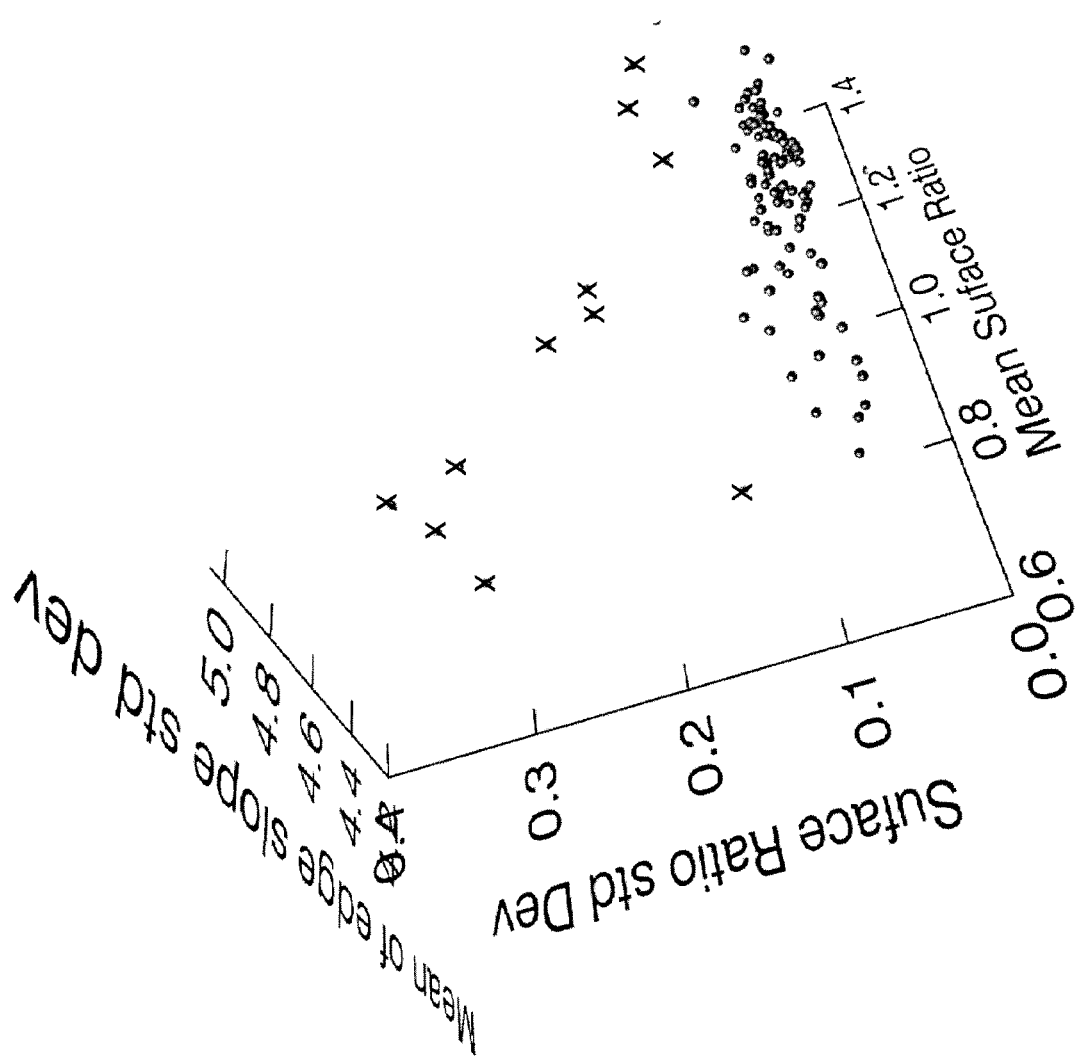
FIG. 10 is a 3D chart indicating example values of 3 features extracted from various coins.

With reference to FIG. 10, comparisons can also be effected on test coins as a whole, for example by using three variables based on the vector components. For example, the comparison can be performed on the basis of the average contour surface area ratios (labelled "Mean Surface Ratio"), the standard deviation of the surface area ratios (labelled "Surface Ratio std Dev"), and the average of the standard deviations of the inclination angles of the contour of the surfaces (labelled "Mean of edge slope std dev"). Each cross represents a different known counterfeited test piece, and each dot represents a different known reference piece. Again, the determination of whether a given test piece is valid can be performed manually, by examining the graphical location of each test piece vis-à-vis the reference pieces, or by machine learning techniques.

In some embodiments, the values of the data points for the test piece are used to classify the test coin into one or more of a plurality of categories, based on their likely validity and/or based on the particular types of irregularities found on the coins. The classification system may be elaborated once a sufficient amount of vector component data for counterfeit coins has been collected. While the above-example focused on 3D topographic data of the heads side of a coin, it should be understood that a similar example implementation could use 3D topographic data from the opposite ("tails") side of the coin.

Each computer application $630_1$-$630_N$ described herein may be implemented in a high level procedural or object oriented programming or scripting language, or a combination thereof, to communicate with a computer system. Alternatively, the computer applications $630_1$-$630_N$ may be implemented in assembly or machine language. The language may be a compiled or interpreted language. Each such computer application $630_1$-$630_N$ may be stored on a storage media or a device, for example a ROM, a magnetic disk, an optical disc, a flash drive, or any other suitable storage media or device. The computer applications $630_1$-$630_N$ may be readable by a general or special-purpose programmable computer for configuring and operating the computer when the storage media or device is read by the computer to perform the procedures described herein. Embodiments of the system may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the coin irregularity detection system herein-disclosed may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A method for detecting an irregularity in a coin having at least one feature, comprising:
   acquiring 3D topographic data of at least one surface of the coin, the 3D topographic data comprising at least one region of interest;
   determining vector components of a normal vector for at least some points of the at least one region of interest;
   defining, with a numerical value, least one feature characteristic from the vector components of each normal vector that fall within a given threshold;
   comparing the numeric value of the at least one feature characteristic against numerical values of reference feature characteristics; and
   providing an irregularity indication based on a difference between the numerical values of the at least one feature characteristic and the reference feature characteristics.

2. The method of claim 1, wherein acquiring 3D topographic data of at least one surface of the coin comprises acquiring data for at least two of a top surface, a bottom surface, and a peripheral surface of the coin.

3. The method of claim 1, wherein acquiring the 3D topographic data comprises acquiring a two-dimensional elevation map image.

4. The method of claim 1, wherein determining vector components of a normal vector comprises determining x, y and z axis components of the normal vectors.

5. The method of claim 1, wherein defining the at least one feature characteristic based on the vector components comprises defining at least one of a contour of a feature, a surface area of a feature, and a distance between two features.

6. The method of claim 1, wherein determining vector components of a normal vector comprises determining an inclination angle and an inclination direction for the at least some points of the at least one region of interest.

7. The method of claim 6, wherein defining the at least one feature characteristic based on the vector components comprises generating an angle image based on the inclination angle of each normal vector and a direction image based on the inclination direction of each normal vector.

8. The method of claim 1, further comprising determining at least one of a currency and a denomination of the coin.

9. The method of claim 8, further comprising identifying the at least one region of interest based on the at least one of the currency and the denomination of the coin, prior to acquiring the 3D topographic data of the at least one surface.

10. The method of claim 1, further comprising repeating the method based on at least one of 3D topographic data of a higher resolution and 3D topographic data of at least one other region of interest.

11. A system for detecting an irregularity in a coin having at least one feature, the system comprising:
    a processing unit; and
    a non-transitory memory communicatively coupled to the processing unit and comprising computer-readable program instructions executable by the processing unit for:
      acquiring 3D topographic data of at least one surface of the coin, the 3D topographic data comprising at least one region of interest;
      determining vector components of a normal vector for at least some points of the at least one region of interest;
      defining, with a numerical value, at least one feature characteristic from the vector components of each normal vector that fall within a given threshold;
      comparing the numerical value of the at least one feature characteristic against numerical values of reference feature characteristics; and
      providing an irregularity indication based on a difference between the numerical values of the at least one feature characteristic and the reference feature characteristics.

12. The system of claim 11, wherein acquiring 3D topographic data of at least one surface of the coin comprises acquiring data for at least two of a top surface, a bottom surface, and a peripheral surface of the coin.

13. The system of claim 11, wherein acquiring the 3D topographic data comprises acquiring a two-dimensional elevation map image.

14. The system of claim 11, wherein determining vector components of a normal vector comprises determining x, y and z axis components of the normal vectors.

15. The system of claim 11, wherein defining the at least one feature characteristic based on the vector components comprises defining at least one of a contour of a feature, a surface area of a feature, and a distance between two features.

16. The system of claim 11, wherein determining vector components of a normal vector comprises determining an inclination angle and an inclination direction for the at least some points of the at least one region of interest.

17. The system of claim 16, wherein defining the at least one feature characteristic based on the vector components comprises generating an angle image based on the inclination angle of each normal vector and a direction image based on the inclination direction of each normal vector.

18. The system of claim 11, wherein the program instructions are further executable for determining at least one of a currency and a denomination of the coin.

19. The system of claim 18, wherein the program instructions are further executable for identifying the at least one region of interest based on the at least one of the currency and the denomination of the coin, prior to acquiring the 3D topographic data of the at least one surface.

20. The system of claim 11, wherein the program instructions are further executable for repeating the method based on at least one of 3D topographic data of a higher resolution and 3D topographic data of at least one other region of interest.

* * * * *